United States Patent
Popp et al.

(10) Patent No.: US 8,905,633 B2
(45) Date of Patent: Dec. 9, 2014

(54) FIRE SENSOR, FIRE DETECTION SYSTEM, FIRE SUPPRESSION SYSTEM, AND COMBINATIONS THEREOF

(75) Inventors: James B. Popp, Olive Branch, MS (US); Arthur J. Benjamin, Germantown, TN (US)

(73) Assignee: Federal Express Corporation, Memphis, TN (US)

( * ) Notice: Subject to any disclaimer, the term of this patent is extended or adjusted under 35 U.S.C. 154(b) by 815 days.

(21) Appl. No.: 12/548,489

(22) Filed: Aug. 27, 2009

(65) Prior Publication Data

US 2009/0315726 A1 Dec. 24, 2009

Related U.S. Application Data

(62) Division of application No. 12/267,033, filed on Nov. 7, 2008, now Pat. No. 7,806,195, which is a division of application No. 11/213,940, filed on Aug. 30, 2005, now Pat. No. 7,810,577.

(51) Int. Cl.
  *G01J 5/00* (2006.01)
  *A62C 37/44* (2006.01)
  *A62C 31/22* (2006.01)
  *A62C 3/08* (2006.01)

(52) U.S. Cl.
  CPC .......... *A62C 37/44* (2013.01); *A62C 31/22* (2013.01); *A62C 3/08* (2013.01)
  USPC ............ 374/121; 374/110; 374/166; 374/124

(58) Field of Classification Search
  USPC .................. 374/121, 166, 124, 110
  See application file for complete search history.

(56) References Cited

U.S. PATENT DOCUMENTS

| | | | |
|---|---|---|---|
| 3,713,491 | A | 1/1973 | Grabowski et al. |
| 3,799,271 | A | 3/1974 | Mitchell et al. |
| 3,848,231 | A | 11/1974 | Wootton |

(Continued)

FOREIGN PATENT DOCUMENTS

| | | |
|---|---|---|
| EP | 0951923 A1 | 10/1999 |
| GB | 485161 | 5/1938 |

(Continued)

OTHER PUBLICATIONS

International Search Report issued Aug. 24, 2007, in PCT/US2007/006981, filed Mar. 21, 2007.

(Continued)

*Primary Examiner* — Mirellys Jagan
(74) *Attorney, Agent, or Firm* — Finnegan, Henderson, Farabow, Garrett & Dunner, L.L.P.

(57) ABSTRACT

A combination fire detection and fire suppression system may include a fire detection system configured to detect an undesirably high temperature associated with an area. The fire detection system may include a temperature sensor including a temperature sensor array and a fire alerting system associated with the temperature sensor. The fire alerting system may be configured to receive information from the temperature sensor and generate a warning signal based on an undesirably high temperature associated with the area. The fire detection system may include a fire control panel configured to receive the warning signal. The system may also include a fire suppression system including a fire suppressant delivery system configured to provide at least one fire suppressant agent to the area associated with the undesirably high temperature.

2 Claims, 16 Drawing Sheets

(56) References Cited

U.S. PATENT DOCUMENTS

| | | | |
|---|---|---|---|
| 3,909,814 A | 9/1975 | Eguchi | |
| 4,011,911 A | 3/1977 | Gow | |
| 4,058,167 A | 11/1977 | Granek et al. | |
| 4,085,167 A | 4/1978 | Lewis et al. | |
| 4,101,872 A | 7/1978 | Pappas | |
| 4,466,489 A | 8/1984 | Lee | |
| 4,566,542 A | 1/1986 | Enk et al. | |
| 4,597,451 A | 7/1986 | Moore et al. | |
| 4,625,808 A | 12/1986 | Halfpenny | |
| 4,646,848 A | 3/1987 | Bruensicke | |
| 4,653,727 A | 3/1987 | Chang et al. | |
| 4,780,832 A * | 10/1988 | Shah | 702/130 |
| 4,875,526 A | 10/1989 | Latino et al. | |
| 4,981,178 A | 1/1991 | Bundy | |
| 4,987,958 A | 1/1991 | Fierbaugh | |
| 5,038,867 A | 8/1991 | Hindrichs et al. | |
| 5,059,953 A | 10/1991 | Parsons et al. | |
| 5,113,945 A | 5/1992 | Cable | |
| 5,279,163 A | 1/1994 | D'Antonio et al. | |
| 5,301,756 A | 4/1994 | Relyea et al. | |
| 5,368,106 A | 11/1994 | Coughlin | |
| 5,511,535 A | 4/1996 | Landstrom et al. | |
| 5,540,402 A | 7/1996 | Carducci | |
| 5,551,780 A * | 9/1996 | Wintrich et al. | 374/45 |
| 5,746,396 A | 5/1998 | Thorton-Trump | |
| 5,880,867 A | 3/1999 | Ronald | |
| 5,881,819 A | 3/1999 | Walters et al. | |
| 5,899,414 A | 5/1999 | Duffoo | |
| 5,913,367 A | 6/1999 | Hampton | |
| 6,003,608 A | 12/1999 | Cunningham | |
| 6,032,745 A | 3/2000 | Sears | |
| 6,104,301 A | 8/2000 | Golden | |
| 6,491,254 B1 | 12/2002 | Walkinshaw et al. | |
| 6,543,547 B2 | 4/2003 | Neumeir et al. | |
| 6,561,281 B1 | 5/2003 | Arnold | |
| 6,588,512 B2 | 7/2003 | Sundholm | |
| 6,601,653 B2 | 8/2003 | Grabow et al. | |
| 6,676,081 B2 | 1/2004 | Grabow et al. | |
| 6,709,154 B1 * | 3/2004 | Janotte | 374/121 |
| 6,719,214 B1 | 4/2004 | Shaffer | |
| 6,739,400 B2 | 5/2004 | Lessi et al. | |
| 6,995,966 B2 | 2/2006 | Zansky et al. | |
| 7,055,613 B1 | 6/2006 | Bissen et al. | |
| 7,137,456 B2 | 11/2006 | Moses | |
| 7,456,750 B2 | 11/2008 | Popp et al. | |
| 2001/0054964 A1 | 12/2001 | Popp et al. | |
| 2002/0037026 A1 * | 3/2002 | Sato et al. | 374/132 |
| 2002/0040789 A1 | 4/2002 | Neumeir et al. | |
| 2003/0230414 A1 | 12/2003 | Peltola et al. | |
| 2005/0140515 A1 | 6/2005 | Goodchild | |
| 2006/0067378 A1 * | 3/2006 | Rege et al. | 374/120 |

FOREIGN PATENT DOCUMENTS

| | | |
|---|---|---|
| GB | 2 117 138 A | 10/1983 |
| GB | 2 327 606 A | 2/1999 |
| SU | 588987 A1 | 1/1978 |
| SU | 1811872 A1 | 4/1993 |
| WO | WO 93/12839 A1 | 7/1993 |
| WO | WO 03072200 A1 | 9/2003 |
| WO | WO 2007/027600 A1 | 3/2007 |

OTHER PUBLICATIONS

Written Opinion issued Aug. 24, 2007, in PCT/US2007/006981, filed Mar. 21, 2007.
International Preliminary Report on Patentability issued Sep. 23, 2008, in PCT/US2007/006981, filed Mar. 21, 2007.
Communication of European Patent Office issued Jan. 13, 2009, in EP 07 753 593.8-1258, which corresponds to PCT/US2007/006981, filed Mar. 21, 2007.
Communication of European Patent Office issued Oct. 30, 2009, in EP 07 753 593.8-1258, which corresponds to PCT/US2007/006981, filed Mar. 21, 2007.
Office Action dated Oct. 3, 2002, in U.S. Appl. No. 09/837,228, filed Apr. 19, 2001.
Office Action dated May 7, 2003, in U.S. Appl. No. 09/837,228, filed Apr. 19, 2001.
Office Action dated Jan. 30, 2004, in U.S. Appl. No. 09/837,228, filed Apr. 19, 2001.
Office Action dated Nov. 19, 2004, in U.S. Appl. No. 09/837,228, filed Apr. 19, 2001.
Office Action dated Jun. 28, 2005, in U.S. Appl. No. 09/837,228, filed Apr. 19, 2001.
Office Action dated Mar. 21, 2006, in U.S. Appl. No. 09/837,228, filed Apr. 19, 2001.
Notice of Panel Decision from Pre-Appeal Brief Review dated Sep. 1, 2006, in U.S. Appl. No. 09/837,228, filed Apr. 19, 2001.
Examiner's Answer dated Nov. 15, 2006, in U.S. Appl. No. 09/837,228, filed Apr. 19, 2001.
Board of Patent Appeals and Interferences Decision on Appeal dated Apr. 29, 2008, in U.S. Appl. No. 09/837,228, filed Apr. 19, 2001.
Notice of Allowance dated Jul. 23, 2008, in U.S. Appl. No. 09/837,228, filed Apr. 19, 2001.
Office Action dated Dec. 24, 2009, in U.S. Appl. No. 12/267,178, filed Nov. 7, 2008.
Notice of Allowance dated Feb. 17, 2010, in U.S. Appl. No. 11/213,940, filed Aug. 30, 2005.
Office Action dated Dec. 9, 2009, in U.S. Appl. No. 12/267,033, filed Nov. 7, 2008.
International Search Report issued Feb. 1, 2007, in PCT/US2006/033518, a counterpart application.
Written Opinion issued Feb. 1, 2007, in PCT/US2006/033518, a counterpart application.
Office Action issued Jul. 7, 2009, in parent U.S. Appl. No. 11/213,940.
Office Action issued Nov. 28, 2008, in parent U.S. Appl. No. 11/213,940.
Final Office Action dated Jun. 8, 2010, in co-pending U.S. Appl. No. 12/267,033, filed Nov. 7, 2008.

* cited by examiner

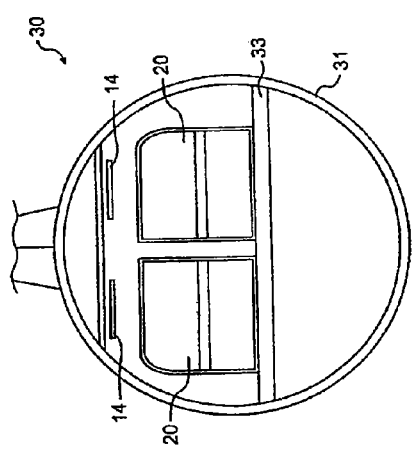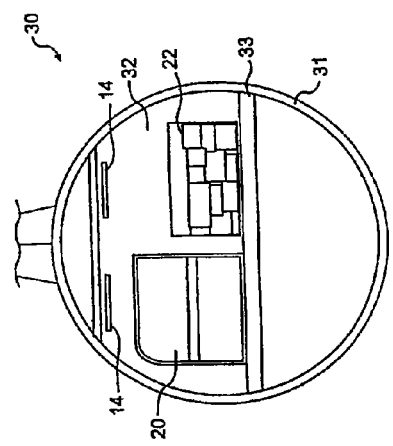

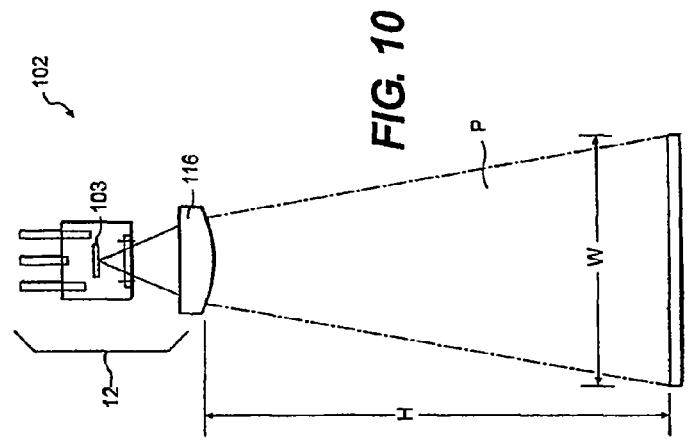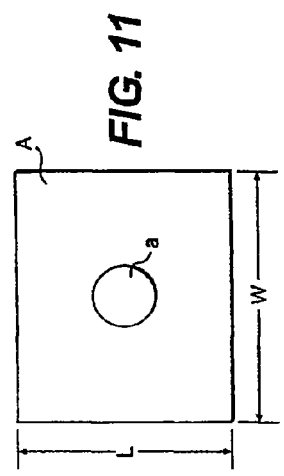

FIRE SENSOR, FIRE DETECTION SYSTEM, FIRE SUPPRESSION SYSTEM, AND COMBINATIONS THEREOF

This application is a divisional of U.S. application Ser. No. 12/267,033, filed Nov. 7, 2008, now U.S. Pat. No. 7,806,195 which is a divisional of U.S. application Ser. No. 11/213,940, filed Aug. 30, 2005 now U.S. Pat. No. 7,810,577, the disclosures of both of which are incorporated herein by reference.

FIELD OF THE INVENTION

The present invention relates to a fire sensor, a fire detection system, a fire suppression system, and combinations thereof. In particular, some aspects of the invention relate to an automated system for at least one of fire detection and fire suppression for storage and/or cargo areas.

BACKGROUND OF THE INVENTION

Cargo may be transported to its destination using one or more of several different types of vehicles, including ships (either passenger ships or cargo ships), aircraft (either passenger aircraft or cargo aircraft), and/or trucks. Cargo may be transported while located in the interior of cargo storage areas. Cargo may further be held within cargo containers and/or loaded onto cargo pallets for transport while en route. In some cases, cargo may include hazardous, easily flammable, and/or easily combustible materials that may render transport dangerous to the cargo itself as well as to the vehicle transporting the cargo and the operators of the cargo transporting vehicle.

In other cases, cargo may be stored at cargo storage facilities in cargo storage areas, in which the cargo may be left unsupervised. In such cases, the possibility still exists that cargo stored in cargo storage facilities may also ignite or explode under certain conditions, thereby damaging other cargo, the cargo storage facility, and/or seriously injuring people that may be present in the cargo storage facility.

In many instances, cargo may be stored, either during transport or when located in a cargo storage facility, in an area separate from an operator controlling the transport vehicle or supervising the cargo storage facility. As a result, an operator or cargo storage facility supervisor may be unaware of a fire or explosion that has occurred in either a cargo container, a cargo pallet, or within the cargo storage area. In addition, there may be more than one cargo container and/or cargo pallet located in any given storage area. This may render it difficult to determine which containers and/or pallets are on fire, even if it has been determined that there is a fire occurring within a given cargo storage area. This may possibly present several problems.

Due to the nature of, for example, a cargo transport vehicle there may be a limited supply of fire suppressant available. For example, aboard a cargo transport aircraft, the weight of any fire suppressant may limit the amount of fire suppressant that may be carried aboard the aircraft for suppressing fires. Therefore, it may be desired to limit the amount of fire suppressant used to extinguish a fire in order to reduce the weight carried by the aircraft by focusing any release of fire suppressant on the particular area in need of fire suppressant rather than throughout the entire cargo area. Furthermore, the fire suppressant itself may be harmful to some types of cargo. Therefore, it may be desirable to limit the distribution of fire suppressant to the location in need of fire suppression so as to limit the spoilage of cargo not in need of fire suppressant. As a result, it may be desirable to provide a fire detection system that can determine the approximate location of a fire so that an appropriate amount of fire suppressant can be directed to the location experiencing the fire.

One potential problem found in cargo areas experiencing a fire is that the cargo is often located remotely from cargo vehicle operators or cargo storage facility supervisors (e.g., the cargo may be located in an unoccupied and/or difficult to access portion of the vehicle or cargo storage facility). This may render it more difficult to provide fire suppressant to an area experiencing a fire in a timely manner. Since it is generally more difficult to extinguish or suppress a fire once it has spread over a large area, it may be desirable to render it possible to provide fire suppressant remotely and in a timely manner.

One example of a cargo transportation vehicle having an operator or operators located relatively remotely from the cargo is an aircraft. The majority of cargo carried by modern aircraft is transported in cargo containers or on cargo pallets. These containers are generally referred generically as Unit Load Devices ("ULDs"). Some ULDs may be constructed of high-strength aircraft grade aluminum alloy, sometimes with sides partially constructed from LEXAN. For safety considerations, ULDs must often mate with an aircraft cargo locking system in order to restrain the cargo containers under various flight, ground load, and/or emergency conditions. Under federal air regulations, ULDs are considered aircraft appliances, are Federal Aviation Administration (FAA) certified for a specific type of aircraft, and are typically manufactured to specifications contained in National Aerospace Standard (NAS) 3610.

An example of a very commonly used industry ULD is the "SAA" designated container, which measures about 88 inches wide by about 125 inches long with an arched roof about 82 inches high. Another example of a ULD is the "AMJ" designated container, which measures about 96 inches wide by about 125 inches long with a maximum height of about 96 inches. For pallets, two typical base dimensions are about 88 inches wide by about 125 inches long and about 96 inches wide by about 125 inches long, although other sizes are also available. Cargo loads on pallets are sometimes stacked and then netted to the pallet using cargo nets having fittings that engage seat track type rails located around the pallets perimeter.

It may be desirable to provide fire detection and/or suppression systems located in cargo areas that may be relatively transparent to cargo handlers (i.e., handlers that load and/or unload cargo into cargo areas), so that there is no requirement for either specific action or involvement by them so that, for example, cargo may be rapidly loaded into and unloaded from the cargo area.

Using a cargo aircraft as an example, while some main deck cargo areas may be conventionally equipped with fire extinguishing bottles intended for manual operation, very few cargo containers and virtually no cargo pallets located on cargo aircraft are accessible to flight crews during a flight, thereby rendering it difficult to manually extinguish a fire located in an aircraft cargo area using fire extinguishing bottles. If, for example, one or more of the cargo containers or cargo pallets contains flammable material and the temperature rises too high and/or the flammable material is otherwise ignited, a fire could start in the cargo container or on the cargo pallet and spread to other cargo containers and/or cargo pallets within the cargo area. Unless someone is in the cargo area at the time the cargo ignites, which is unlikely at least for the reasons outlined above, such a fire could remain undetected and/or inaccessible to the flight crew. If undetected or inaccessible, the fire could spread to other cargo containers and/or cargo pallets, thereby endangering the safety of the flight crew and the cargo aircraft. The same possibility of spreading exists for other cargo vehicles and cargo storage facilities.

As an example, shorter range cargo aircraft operating over land are typically within about 15 minutes or less flying time of suitable airfields for performing an emergency landing should an emergency such as, for example, a cargo fire, occur. Currently, the FAA has certified smoke detectors for detecting fires on board aircraft, although smoke detectors may present some limitations. Cargo aircraft may be equipped with main deck smoke curtains and/or solid bulkheads, for example, which may provide a flight crew with an extended cockpit smoke free period in case of fire in an aircraft cargo area. Under such circumstances, there may be a relatively low probability of a cargo aircraft loss due to a cargo fire. Nevertheless, in such situations, a fire detection system is desirable for providing early detection, thereby allowing sufficient time to divert the cargo aircraft to an airfield for performing an emergency landing. Furthermore, once the aircraft has landed, it is still desirable for ground fire-fighting personnel to be able to extinguish the fire by locating the fire and conveying fire suppressant material to it.

In contrast to flights over land, a different situation may occur on international flights. Many such flights may spend a relatively large duration of time over oceans or other large bodies of water, and an aircraft could be as many as three or more hours flying time from landfall. Under such circumstances, if a cargo fire should occur, the capability to extinguish or at least suppress the cargo fire for an extended period of time until a suitable airfield for performing an emergency landing can be reached may be essential for survival of the flight crew and the aircraft as well as the cargo. Therefore, both a fire detection system for quickly detecting a fire and an on-board fire suppression system for suppressing or extinguishing the fire may be desirable.

The problem of detecting and/or suppressing fires is not limited to the cargo transportation industry, however. A problem may arise, for example, wherever cargo and/or other articles are stored in a location that is remote from a person supervising the cargo or other articles, such as, for example, a cargo storage facility. Thus, in a broad variety of situations, it may be desirable to remotely detect and/or remotely suppress a fire in its initial stages before it can grow out of control.

One subject of the invention may be to provide a system configured to detect a fire or an unacceptably high temperature in a location remote from a person overseeing the location, such as a cargo storage facility supervisor or an aircraft flight crew member.

Another subject of the invention may be to provide a system configured to provide an alert based on detection of a fire or an unacceptably high temperature in a location remote from a person overseeing the location, such as a cargo storage facility supervisor or an aircraft flight crew member.

Yet another subject of the invention may be to provide a system configured to identify a particular area, pallet, and/or container experiencing a fire or an unacceptably high temperature.

Still another subject of the invention may be to provide a system for suppressing a fire and/or cooling an area, pallet, and/or container identified as experiencing a fire or an unacceptably high temperature.

SUMMARY

In the following description, certain aspects and embodiments of the present invention will become evident. It should be understood that the invention, in its broadest sense, could be practiced without having one or more features of these aspects and embodiments. In other words, these aspects and embodiments are merely exemplary.

One aspect of the invention relates to a combination fire detection and fire suppression system. The system may include a fire detection system configured to detect an undesirably high temperature associated with an area. The fire detection system may include a temperature sensor including a temperature sensor array configured to receive temperature information associated with the area and a fire alerting system associated with the temperature sensor. The fire alerting system may be configured to receive information from the temperature sensor and generate a warning signal based on an undesirably high temperature associated with the area. The fire detection system may include a fire control panel associated with the fire alerting system. The fire control panel may be configured to receive the warning signal. The system may also include a fire suppression system including a fire suppressant delivery system configured to provide at least one fire suppressant agent to the area associated with the undesirably high temperature.

As used herein, the term "fire" is not necessarily limited to a fire having visible flames. Rather, the term "fire" is used in a broad sense and may be used to describe situations in which an object and/or surface is exhibiting a higher temperature than desired or considered to be unsafe to a person having skill in the art, such as, for example, a situation in which an object and/or surface is smoldering, smoking, and/or is hot to the touch.

According to another aspect, a system for protecting cargo may include a combination fire detection and fire suppression system according to exemplary aspects described herein and at least one cargo unit.

In yet another aspect, a fire detection system configured to detect an undesirably high temperature associated with an area may include a temperature sensor including a temperature sensor array configured to determine temperature information associated with the area. The fire detection system may further include a fire alerting system associated with the temperature sensor. The fire alerting system may be configured to receive information from the temperature sensor and generate a warning signal based on an undesirably high temperature associated with the area. The fire detection system may also include a fire control panel associated with the fire alerting system, and the fire control panel may be configured to receive the warning signal.

In still a further aspect, a temperature sensor array configured to determine temperature information associated with an area may include a base, and a plurality of temperature sensing devices associated with the base such that the temperature sensing devices are configured to monitor the temperature of the area. At least one of the temperature sensing devices may be oriented at an angle with respect to the base that differs from an angle with respect to the base at which at least one other temperature sensing device is oriented with respect to the base.

According to yet another aspect, a fire suppression system may be configured to at least one of reduce the temperature of an area experiencing an undesirably high temperature, suppress a fire associated with the area, and extinguish a fire associated with the area. The fire suppression system may include a fire suppressant delivery system configured to provide at least one fire suppressant agent to the area. The fire suppressant delivery system may include a first container containing a surfactant, a second container containing a gas, and at least one manifold in flow communication with the first and second containers. A nozzle may be in flow communication with the at least one manifold, and the nozzle may be configured to discharge fire suppressant agent generated by mixing the surfactant and the gas. The fire suppression system may further include an extension device associated with the nozzle, and the extension device may be configured to move the nozzle.

Aside from the structural arrangements set forth above, the invention could include a number of other arrangements such as those explained hereinafter. It is to be understood that both the foregoing description and the following description are exemplary only.

BRIEF DESCRIPTION OF THE DRAWINGS

The accompanying drawings are incorporated in and constitute a part of this specification. The drawings illustrate exemplary embodiments and, together with the description, serve to explain some principles of the invention. In the drawings.

FIG. 3 is a schematic, partial section view of an exemplary embodiment of a cargo area;

FIG. 4 is a schematic, partial section view of an exemplary embodiment of a cargo area in another configuration;

FIG. 10 is a schematic, elevation view of an exemplary embodiment of a fire temperature sensor;

FIG. 11 is a schematic, plan view of an area monitored by the fire temperature sensor of FIG. 10;

DESCRIPTION OF SOME EXEMPLARY EMBODIMENTS

Figure 1:
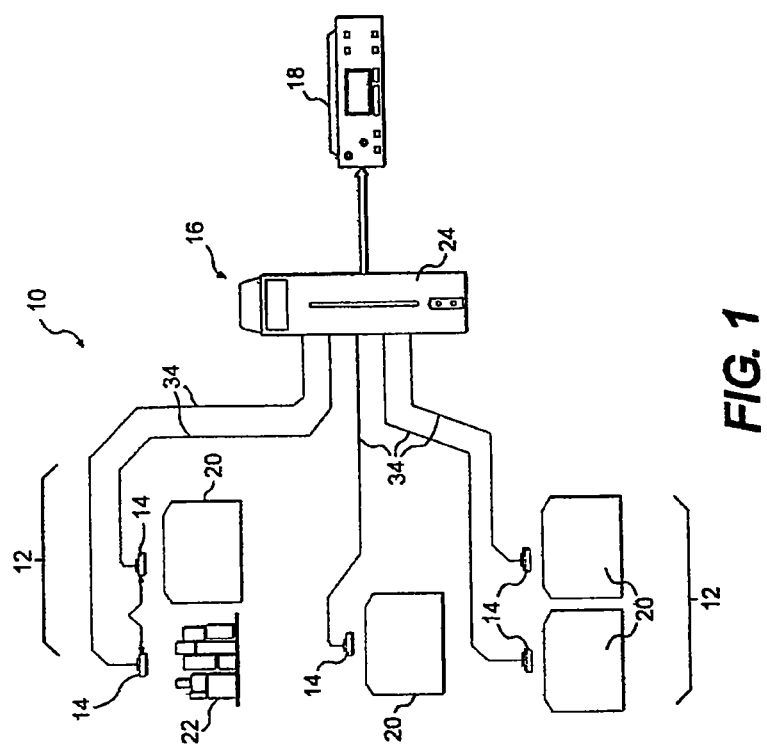
FIG. 1 is a schematic view of an exemplary embodiment of a fire detection system in accordance with the present invention.

Reference will now be made in detail to some exemplary embodiments of the invention. Wherever possible, the same reference numbers are used in the drawings and the description to refer to the same or like parts.

Figure 2:
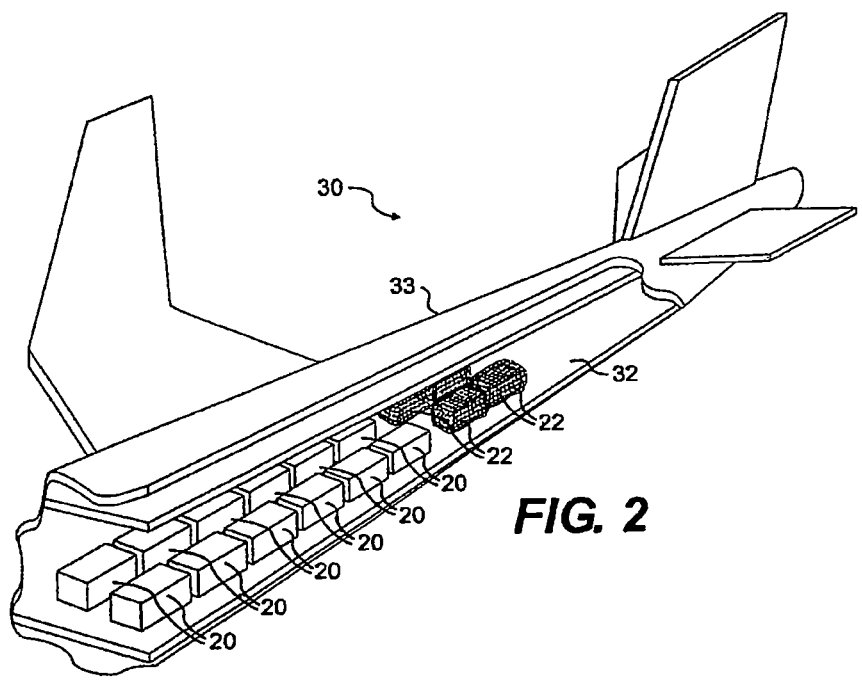
FIG. 2 is a schematic, perspective view an exemplary embodiment of an aircraft.

FIG. 1 depicts an exemplary embodiment of a fire detection system 10. This exemplary embodiment of a fire detection system 10 is described in relation to a cargo aircraft 30 shown in FIG. 2 merely as an example of one possible environment in which this system may be used. Use in other environments is also possible and contemplated, such as, for example, in passenger aircraft having a cargo area, passenger ships and cargo ships, trucks, trains, other types of cargo transportation vehicles, and/or cargo storage facilities.

The exemplary fire detection system 10 depicted in FIG. 1 may include a fire temperature sensor system 12 including one or more fire temperature sensors 14, a fire alerting system, and a fire control panel 18. The one or more fire temperature sensors 14 may be located in a cargo area 32 (FIG. 2) of, for example, a cargo transport aircraft 30. The one or more fire temperature sensors 14 may be located above a cargo container 20 and/or a cargo pallet 22 to detect the presence of a fire and/or a temperature higher than desired, which may indicate a situation potentially hazardous to the cargo, the cargo storage area, the cargo transportation vehicle transporting the cargo, and/or people associated with the cargo transportation vehicle, such as, for example, the flight crew of a cargo aircraft.

According to some embodiments, the fire temperature sensors 14 may be connected to a fire alerting system, such as the fire alerting system 16 depicted in FIG. 1. The fire alerting system 16 may include a fire warning computer 24, which may in turn be associated with a fire control panel 18, which may be located in, for example, the cockpit of a cargo aircraft 30. For example, the fire detection system 10 may be used in a cargo transportation aircraft 30, which may contain one or more cargo containers 20 and/or cargo pallets 22 (see, e.g., FIG. 2 which schematically depicts a cargo aircraft 30 having a cargo area 32 containing a plurality of cargo containers 20 and a plurality of cargo pallets 22). As shown in FIG. 1, the fire temperature sensors 14 may be positioned, for example, above cargo containers 20 and/or cargo pallets 22. The fire temperature sensors 14 may be connected (e.g., in a hardwired fashion and/or via a wireless link) to a fire alerting system 16 including, for example, a fire warning computer 24, which monitors the information received from the fire temperature sensors 14 and determines whether a potential and/or existing condition exists that may indicate a fire or temperature reading higher than a desired amount.

Figure 5:
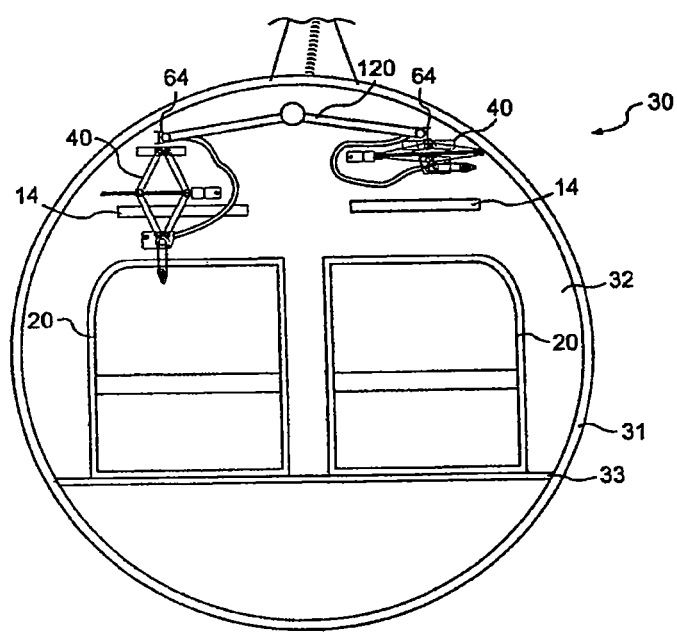
FIG. 5 is a schematic, partial section view of an exemplary embodiment of a fire detection system and portions of an embodiment of a fire suppression system.
Figure 6:
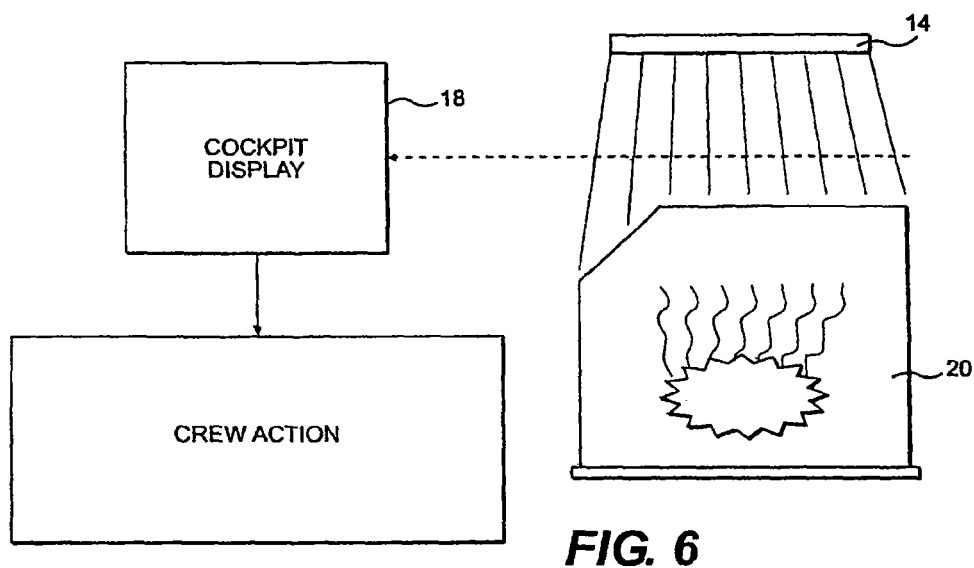
FIG. 6 is a schematic view of portions of an exemplary embodiment of a fire detection system.

The fire alerting system 16 may be programmed, for example, prior to flight, using weight, balance, and/or preflight load plan information, so that the cargo location and/or whether the cargo is in a cargo container 20 or on a cargo pallet 22, for a given location in the cargo area 32, may be known. The fire alerting system 16 may be connected (e.g., in a hardwired fashion and/or via a wireless link) to the fire control panel 18 located in, for example, a cockpit of a cargo aircraft 30, so that the flight crew may initiate appropriate action and/or so that a fire suppression system (see, e.g., the exemplary fire suppression system 40 depicted in FIG. 5) may be automatically activated (see, e.g., FIG. 6). In this fashion, the fire control panel 18 may receive data from the fire alerting system 16 and may provide, for example, a flight crew with fire warning alerts, high temperature alerts, the type of cargo involved with the alerts, system status information, the location and temperature of a cargo fire, and/or a temperature warning alert.

According to some embodiments, a fire temperature sensor system 12 may include one or more fire temperature sensors 14, and electronic circuitry to process and form the temperature sensor information for delivery to the fire alerting system 16 (e.g., fire warning computer 24). The fire temperature sensors 14 may be in the form of a single sensor and/or of a matrix of individually packaged sensors. For example, as depicted in FIGS. 12-17, a fire temperature sensor 14 may be in the form of a fire temperature sensor array 110 formed by a matrix of a plurality of temperature sensors (e.g., four or thirty-six packaged thermopiles 102 (see, e.g., FIGS. 12-17)). Operational amplifiers may be provided for the temperature sensors to increase the strength of any signals generated by the temperature sensors.

For example, each individual sensor 102 (e.g., thermopile) may be configured to project an approximate 7° field of view onto a sensor's sensitive monitored area (see, e.g., FIGS. 10 and 11, which depict an exemplary field of view of a single thermopile 102). The thirty-six sensors 102, for example, may be mounted in a mounting base 112 (see, e.g., FIGS. 12-14), for example, an aluminum block, at angles that will fully monitor a 96 inch by 125 inch area, for example, the upper surface of a cargo container from a distance (e.g., height) ranging from about 1 inch to about 100 inches.

Figure 7:
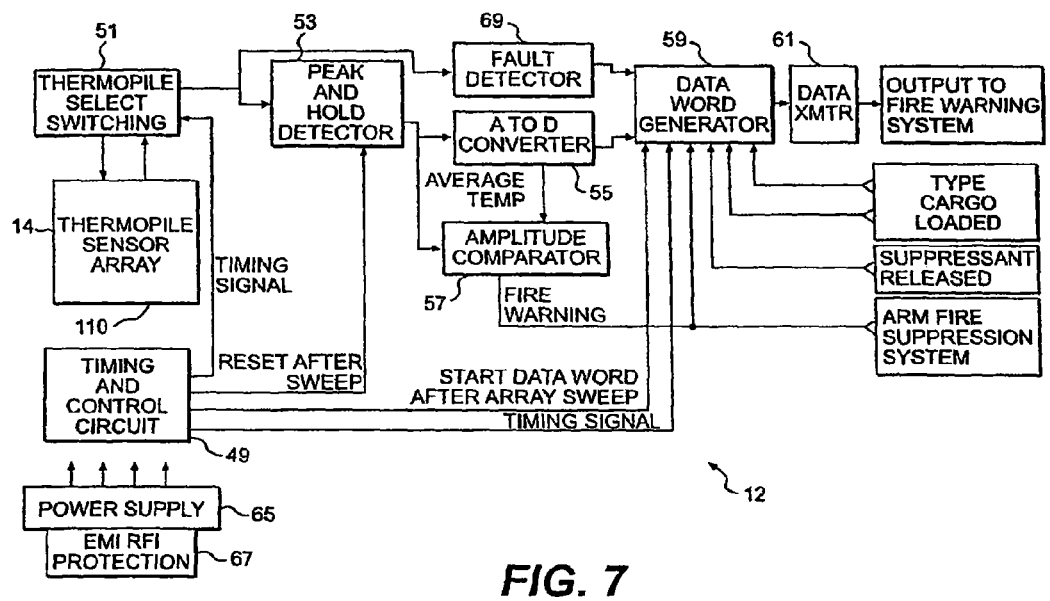
FIG. 7 is a schematic, block diagram view of an exemplary embodiment of a fire temperature sensor system.

Referring to the exemplary fire temperature sensor system 12 depicted schematically in FIG. 7, information from each fire temperature sensor 14 may be scanned, for example, one-at-a-time, via analog switches using a timing and control circuit 49 and thermopile select switching device 51, which may continuously scan the information received from the thirty-six sensors 102 and which may record, for example, the average in maximum output of any of the thirty-six sensors 102. For example, if during operation, one sensor 102 detects a "hot spot," its output voltage will increase and an analog circuit (e.g., peak and hold detector 53) will hold the peak output voltage for multiple scans. The peak output voltage may be sent to an analog-to-digital (A/D) converter 55 and to an amplitude comparator 57. The A/D converter 55 may convert the analog peak output voltage of the sensor 102 into data bits for inclusion in a data word generated by a data word generator 59, which may be transmitted via a data transmitter 61 to a fire alerting system, such as the fire alerting system 16. The amplitude comparator 57 may be configured to compare a reference temperature measured, for example, by an ambient temperature detector (see, e.g., ambient temperature sensor 120 in FIGS. 12, 13, and 15-17) associated with the fire temperature sensor 14, to the peak temperature measured by the sensor 102. If the difference is greater than, for example, a predetermined reference voltage, a fire warning bit is generated. The fire warning bit may be included in the data word transmitted from the fire temperature sensor 14 to the fire alerting system 16. The data bit may also activate a transistor to arm a fire suppressant delivery system such those described herein. The fire temperature sensor 14 may also include a power supply 65 configured to provide power for the fire temperature sensor 14 and electromagnetic interference (EMI) and/or radio frequency interference (RFI) protection 67 configured to protect the fire temperature sensor 14 from responding to spurious false and/or unrelated signals.

According to some embodiments, output from the sensors 102 may also be transmitted to a fault detector 69, for example, if the output of any sensor 102 is significantly less than a prefixed reference voltage. In such circumstances, it may be an indication of a fault in the sensor 102 and/or the electronic circuitry, and the fault detector 69 may use this information, for example, to turn off the fire temperature sensor data word transmitter 61. The data word output from the fire temperature sensor 14 may include, for example, a system name and/or label, system identification, detected temperature, cargo type (e.g., container or pallet), fire suppressant delivery system status and parity word check.

Figure 8:
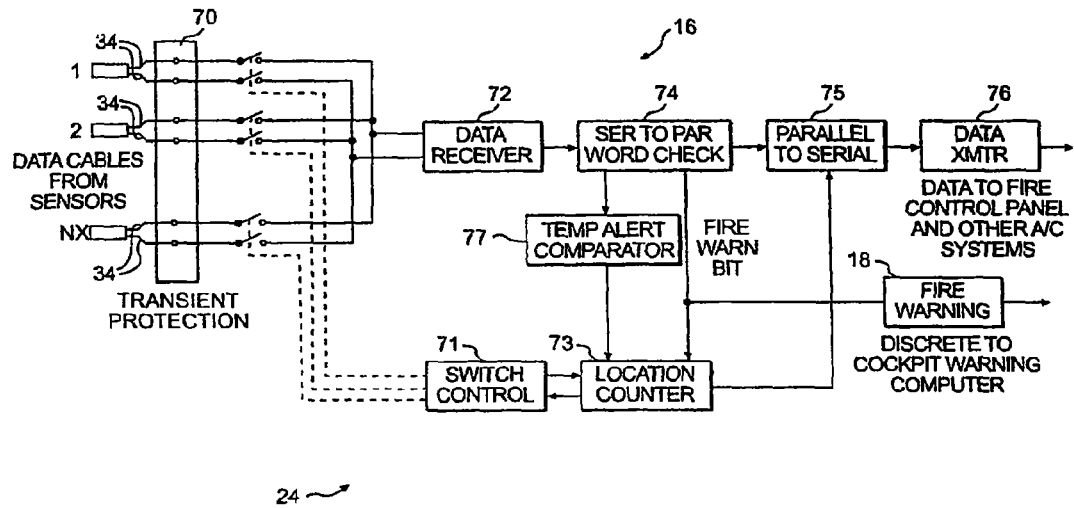
FIG. 8 is a schematic, block diagram view of an exemplary embodiment of a fire alerting system.

FIG. 8 depicts an exemplary embodiment of a fire alerting system 16 that may be used, for example, with a fire detection system 10 according to some embodiments. The fire alerting system 16 may include a fire warning computer 24 configured to receive data of each of the fire temperature sensors 14 installed, for example, throughout a cargo aircraft 30. Each fire temperature sensor 14 may be configured to transmit its data word to the fire alerting system 16 over, for example, a dedicated twisted pair cable 34 or via a wireless transmission. Each input to the fire alerting system 16 may be filtered to remove electrical noise, transient voltages, electromagnetic interference, and/or radio frequency interference, for example, via a conventional transient protection system 70. The data transmitted from the fire temperature sensors 14 may be sequentially selected by analog multiplexers (e.g., via switch control 71) and may be passed to a data receiver 72. The data receiver 72 may check incoming data words for missing pulses and word parity. The data words may be transmitted from the data receiver 72 and may be clocked, for example, cascaded, into serial-to-parallel converters in serial-to-parallel word checker 74. Each data word may be checked for system label authenticity and system identity in the serial-to-parallel word checker 74. If, for example, a system label and system identity are correct, the serial data word may be accepted. If, however, the system label and system identity are incorrect, and/or there are missing bits, the serial-to-parallel converters may be reset and may be readied for receipt of the next data word.

According to some embodiments, temperature sensor data bits may be selected and may be passed to a digital-to-analog (D/A) converter, and a resulting analog signal may be compared to a fixed reference in a temperature alert comparator 77. If the resulting analog signal is higher than the fixed reference, a fire warning data bit may be generated and sent to a location counter 73. All data bits except location data bits and the fire warning data bit may be sent to a parallel-to-serial converter 75. The location counter data bits (i.e., location, temperature alert, and fire warning) may be sent to the parallel-to-serial converter 75. Data words formatted in the parallel-to-serial converter 75 may be clocked-out to data transmitter 76 at a rate specified for the data system in use. Data words transmitted via the data transmitter 76 may be sent to the fire control panel 18 and/or to other systems that may use the data. The fire warning data bit may also activate a transistor to provide a discrete ground to enunciate a fire warning in, for example, a fire warning system (e.g., a cockpit-located fire warning computer 24).

Figure 9:
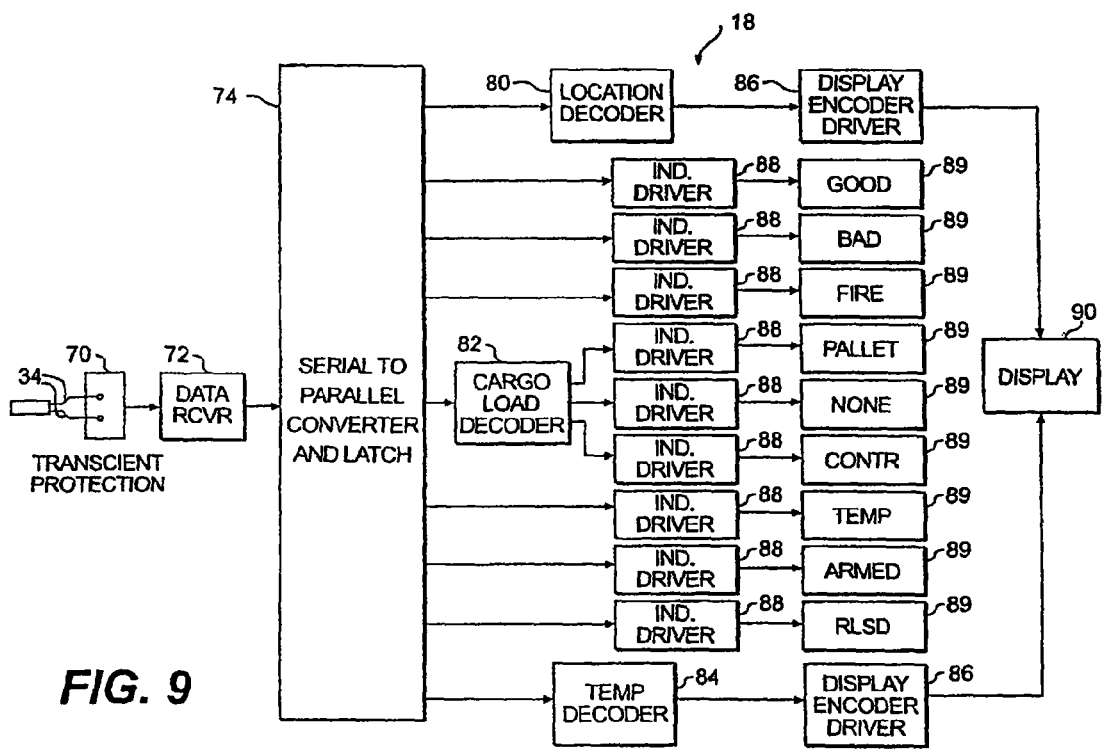
FIG. 9 is schematic, block diagram view of an exemplary embodiment of a fire control panel.

According to some embodiments, a fire detection system 10 may include a fire alerting system 16 and a fire control panel 18, for example, the exemplary embodiment of fire control panel 18 shown in FIG. 9. The fire control panel 18 may be configured to receive a data word from, for example, the fire alerting system 16 (e.g., fire warning computer 24) via a dedicated data cable 34 and/or via a wireless link. The data word may be filtered for noise and/or transient signals via transient protection system 70, and may pass to a data receiver 72. The data receiver 72 may be configured to check the incoming data word for missing bits and parity. If the incoming data word contains a good data word, it may then be clocked into serial-to-parallel converters 74. For example, the data word may be checked for proper label and identity. A bad data word may be rejected, and the serial-to-parallel converters 74 may be reset to zero, for example, so that they are ready for receiving a new data word. If the incoming data word is determined to be a good data word, the data word is latched. Location bits received from the serial-to-parallel converters 74 may be sent to a binary-to-BCD decoder (e.g., location decoder 80, cargo load decoder 82, and/or temperature decoder 84). BCD data from the serial-to-parallel converters 74 may be sent to a BCD-to-seven segment display encoder driver 86, and then to a display 90, for example, an LCD display.

Temperature data bits from the serial-to-parallel converters 74 may be sent to a binary-to-BCD decoder. BCD data from the serial-to-parallel converters 74 may be sent to the BCD-to-seven segment display encoder driver 86, and then to the display 90. Cargo load data bits may be sent to a cargo load decoder 82. The cargo load decoder 82 may determine the type of cargo that is being monitored, for example, a cargo container 20 or a cargo pallet 22. All other data bits may drive indicator drivers 88 and their associated indicator 89.

According to some exemplary embodiments, the fire control panel 18 may be mounted in, for example, the cockpit of a cargo aircraft 30 for use by a flight crew. The fire control panel 18 may provide a flight crew with all data related to protection and suppression of a cargo fire. The fire control panel 18 may perform at least one of the following functions: 1) provide temperature alerts for excessively high and/or rising temperatures, indicating temperature and location; 2) enunciate a fire warning, indicating temperature and location of the fire; 3) indicate the type of cargo (i.e., cargo container 20 or cargo pallet 22) loaded into each cargo position for enunciating the activation of a fire suppression system 40 based on the type of cargo located in the implicated cargo position; 4) enunciate the activation of a fire suppressant release control; and 5) enunciate a fault or failure of a fire temperature sensor 14 and its location. According to some exemplary embodiments, such functions may be performed via any of various known alerting devices/methods, such as, for example, via a warning light or lights, and/or via audible warnings.

According to some embodiments, a fire temperature sensor system 12 may include a fire temperature sensor 14 including one or more sensors 102. For example, FIG. 10 depicts an exemplary sensor system 12, and FIG. 11 depicts an area of coverage of the sensor system 12 shown in FIG. 10. According to some embodiments, the sensor system 12 may include a temperature sensor 102. Temperature sensors 102 may be thermopiles (e.g., TO-5 and/or TO-18 packaged thermopiles), which may be configured to sense temperature over a broad wavelength spectrum, and which may include a sensitive detector for observing an area A and averaging the temperature of the observed area A. Other temperature sensors known in the art may be used. Thermopiles are sometimes associated with a packaging and/or device case (not shown) in which they are enclosed. The packaging and/or device case, at least to a certain extent, may determine the area of view of the thermopile for a given distance or range to a target object. For example, the field of view of a thermopile may be compared to the conical beam of a flashlight, as schematically-depicted in FIG. 10. Furthermore, thermopiles may be packaged either as a single unit or as multiple sensors in a single sensing device.

According to some exemplary embodiments of the fire detection system 10, a plurality of temperature sensors 102 may be arranged in an array 110 (see, e.g., FIGS. 12-17). Such temperature sensor arrays 110 may be positioned over cargo containers 20 and/or cargo pallets 22. The temperature sensor array 110 may be configured to monitor a specifically-sized area A located a specific distance from the temperature sensor array 110. The area A may be occupied by one or more cargo containers 20 and/or cargo pallets 22.

The principle of use of a fire temperature sensor array 110 including multiple temperature sensors 102 to detect heat and/or fires will now be described in more detail. One or more cargo containers 20 and/or cargo pallets 22 may be placed under observation and may be divided into multiple sections or sub-areas, with each section or sub-area under observation by, for example, an individual sensor 102 of a temperature sensor array 110. According to some embodiments, for example, a temperature sensor array 110 may be mounted over each cargo container 20 and/or cargo pallet 22 and/or a portion of the cargo area 32 under observation.

With reference to FIGS. 12-17, which depict exemplary embodiments of a temperature sensor array 110, a temperature sensor array 110 may include a mounting base 112 configured to house a plurality of temperature sensors 102. The mounting base 112 may be formed, for example, by machining, by molding (e.g., if a composite material is used to form the mounting base 112), and/or by any other method that results in the desired configuration of the temperature sensor array 110. The mounting base 112 may be formed of, for example, aluminum and/or composite material, or any other suitable material. The mounting base 112 of the temperature sensor array 110 may include a number of mounting holes 114, each for receiving a respective one or more temperature sensors 102 therein, which may be oriented at angles that vary slightly, for example, from each other and/or an orthogonal reference O with respect to the mounting base 112. In other words, the mounting holes 114 may be oriented, for example, via drilling and/or molding into the mounting base 112 at small but slightly differing angles, such that the temperature sensors 102 are aimed at multiple-fixed aiming points located on the area to be observed.

As depicted in FIG. 10, an exemplary temperature sensor 102 may include a heat sensor such as, for example, an infrared thermopile 103, and a lens 116, such that for a given height H, the thermopile 103 will view an area A of an object to be observed by the thermopile 103. Since the thermopile 103 observes an area A based on a cross-section of a generally conical-shaped projection P, the size of the area A increases as the distance from the lens 116 increases, for example, similar to the cone of the beam of light emitted from a flashlight, which grows larger in cross-sectional area as the distance from the flashlight increases.

FIG. 11 depicts an area A having a given length L and width W for which the temperature is desired to be observed. For a single temperature sensor 102, an area a within the larger area A is observed. Furthermore, as the distance H from the area A to be observed is increased, that is, as the distance H between the temperature sensor 102 and the area desired to be observed increases, the area A observed by the temperature sensor 102 increases as well. As the area A observed by the temperature sensor increases, however, the ability to detect high temperatures within the increased observed area may become compromised by the fact that the temperature sensor detects the average temperature observed over the entire area being observed. This may present an issue when, for example, a thermal event results in a large temperature increase at a localized "hot spot" located in some sub-area of the total observed area A. To the extent that a temperature sensor measures the average temperature for the entire observed area A, a localized high temperature may not be detected within the observed area due to this averaging phenomenon.

Such a situation may occur, for example, when cargo containers and/or cargo pallets are observed. For example, a localized "hot spot" that might otherwise indicate the presence of a fire in a cargo container may be detected by a single temperature sensor, but may render a reading that does not provide a basis for alerting a flight crew due to averaging errors, as will be explained in more detail below. On the other hand, an array of temperature sensors 110 mounted in a mounting base 112 such that each temperature sensor 102 observes a sub-area of a larger area, such as the top of a cargo container 20 and/or a cargo pallet 22, may be more likely to detect the presence of "hot spots" that may be an indication of the presence of a fire in the cargo container 20 and/or on the cargo pallet 22.

During operation, a thermopile averages the infrared energy in the area it monitors. For example, assume that a thermopile has a conical field of view that permits it at a certain range to monitor, for example, a circular area having a diameter of about 3.3 feet or an area of about 9 square feet (1296 square inches). Assume the temperature in that area is 100° Fahrenheit. Assume that a small fire occurs within this relatively large area and a 1,000° Fahrenheit. "hot spot" of 3.385 inches in diameter occurs, which represents an area of 9 square inches. The thermopile will detect an increase in temperature, but it will do so by additively computing an average temperature by the difference in areas. In other words, the thermopile will detect a temperature of 107° Fahrenheit, thus almost completely overlooking the 9 square inch "hot spot" that has a temperature of 1,000° Fahrenheit. Such a small detected temperature rise will not likely be enough to indicate a fire in a reliable manner, thereby possibly rendering a single, fixed thermopile device at least somewhat unsuitable for monitoring the temperature of relatively large areas from a distance that results in a large averaging error.

If, however, an array of nine temperature sensors (e.g., nine thermopiles), for example, is used to observe the 9 square feet referred to in the example above, with each temperature sensor observing, for example, one square foot (144 square inches), one temperature sensor of the nine temperature sensors would see the 9 square inch "hot spot" and would detect the temperature of that "hot spot" to be about 162.5° Fahrenheit. If, however, the "hot spot" was observed equally by two temperature sensors (e.g., by virtue of each temperature sensor being aimed such that they each observe only about half of the 9 square inch area) the lowest temperature either would observe would be about 131.25°. Therefore, by increasing the number of temperature sensors observing an area of a given size at a given distance, the temperature sensors may be rendered more useful in detecting "hot spots," for example, than the use of a single temperature sensor, for a given distance between the temperature sensor(s) and the area to be observed. Furthermore, the higher number of temperature sensors used to monitor the given area, the more sensitive the detection may become.

According to some exemplary embodiments, one or more of the exterior surfaces of the containers may be configured to have an emissivity sufficient to provide effective readings by the temperature sensors. For example, the upper surface of a container may be altered in order to raise the upper surface's emissivity to a value ranging from about eight tenths to about one, for example, to about 0.95. The emissivity of the surface may be increased, for example, via application of a sticker and/or paint (e.g., paint in colors ranging from white to black) substantially covering the upper surface of the container. Other methods of increasing the emissivity known to those having ordinary skill in the art are contemplated. It may be desirable to increase the emissivity via a method and/or device that will resist degradation caused by heat.

Figure 12:
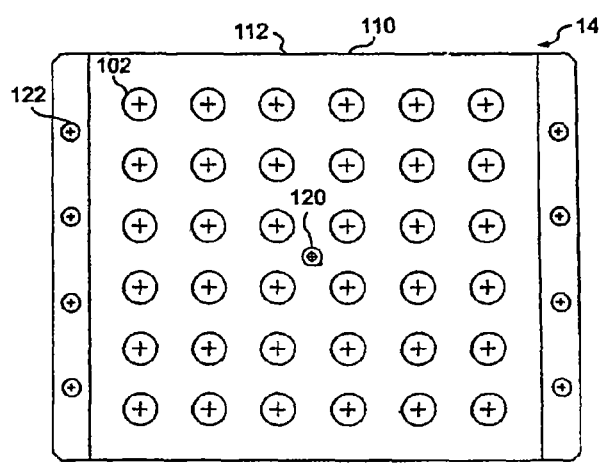
FIG. 12 is a schematic, plan view of an exemplary embodiment of a fire temperature sensor array.
Figure 13:
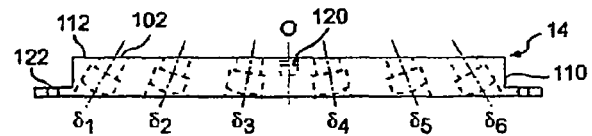
FIG. 13 is a schematic, front view of the fire temperature sensor array of FIG. 12.
Figure 14:
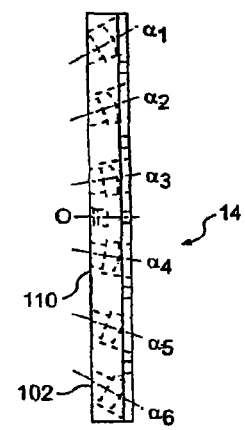
FIG. 14 is a schematic, side view of the fire temperature sensor array of FIG. 12.

In the exemplary embodiment of a temperature sensor array 110 depicted in FIGS. 12-14, the temperature sensor array 110 may include the mounting base 112 and thirty-six temperature sensors 102 mounted in the mounting base 112. The mounting base 112 may include a number of apertures 122 configured to attach the mounting base 112 to a support in, for example, a cargo area 32 of an aircraft 30. In the exemplary embodiment depicted in FIG. 12, the temperature sensors 102 are arranged in a pattern of six rows and six columns, although temperature sensor array 110 according to some aspects may include different numbers of temperature sensors 102 arranged in various differing configurations. The exemplary temperature sensor array 110 depicted in FIG. 12 also includes a temperature sensor 120 for determining the ambient temperature in the cargo area 32.

As depicted in FIGS. 13 and 14, the temperature sensors 102 may be arranged in the mounting base 112 such that they are aimed at slightly differing angles from one another and such that the combination of the temperature sensors 102 observes a larger area than if the temperature sensors 102 were each aimed at the same angle with respect to the mounting base 112, for example, parallel to axis O, which may be orthogonal to the mounting base 112.

According to the exemplary embodiment depicted in FIG. 13, for example, each of the temperature sensors 102 may be arranged at an angle ($\delta_1$, $\delta_2$, $\delta_3$, $\delta_4$, $\delta_5$, and $\delta_6$) that varies slightly from the angle of the other temperature sensors 102 and/or from an orthogonal line with respect to the mounting base 112 for a given row of the temperature sensor array 110, for example, as depicted in FIGS. 13 and 14. For example, the angles $\delta_1$, $\delta_2$, $\delta_3$, $\delta_4$, $\delta_5$, and $\delta_6$ may range from about 1 degree to about 60 degrees. For example, angles $\delta_1$, $\delta_2$, $\delta_3$, $\delta_4$, $\delta_5$, and $\delta_6$ may be about −26.4°, −16.6°, −5.7°, 5.7°, 16.6°, and 26.4° relative to orthogonal axis O, respectively.

Referring to FIG. 14, each column of the exemplary temperature sensor array 110 of FIG. 12 may include temperature sensors 102, each oriented at an angle ($\alpha_1$, $\alpha_2$, $\alpha_3$, $\alpha_4$, $\alpha_5$, and $\alpha_6$) that varies slightly from the angle of the other temperature sensors 102 for a given column of the temperature sensor array 110. For example, the angles $\alpha_1$, $\alpha_2$, $\alpha_3$, $\alpha_4$, $\alpha_5$, and $\alpha_6$ may range from about 1 degree to about 60 degrees. For example, angles $\alpha_1$, $\alpha_2$, $\alpha_3$, $\alpha_4$, $\alpha_5$, and $\alpha_6$ may be about −21.5°, −13.3°, −4.5°, 4.5°, 13.3°, and 21.5° relative to orthogonal axis O, respectively. The exemplary temperature sensor array 110 depicted in FIGS. 12-14 may accurately monitor a relatively large area, such as the top of a cargo container 20 and/or the upper surfaces of a cargo pallet 22 by virtue of its large number of thermopiles 102, as explained above. The arrangement and number of temperature sensors 102 may be different, and the configuration of the mounting base 112 may be different.

According to some embodiments, the fire temperature sensor 14 may include fewer temperature sensors 102 than the embodiment depicted in FIGS. 12-14. For example, the exemplary fire temperature sensor 14 depicted in FIGS. 15-17 includes four temperature sensors 102 that may be located and arranged to optimize the monitoring of a particular area. According to the exemplary embodiment depicted in FIG. 16, for example, each of the temperature sensors 102 may be arranged at an angle ($\delta_1$ and $\delta_2$) that varies slightly from the angle of the other temperature sensors 102 and/or from an orthogonal line with respect to the mounting base 112 for a given row of the temperature sensor array 110. For example, the temperature sensors 102 may be located in corner regions of a mounting base 112, as depicted in FIGS. 15-17, although the arrangement and number of temperature sensors 102 may be different, and the configuration of the mounting base 112 may be different.

Figure 15:
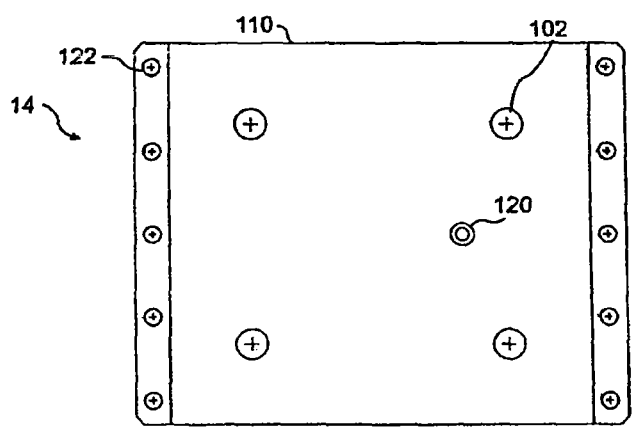
FIG. 15 is a schematic, plan view of another exemplary embodiment of a fire temperature sensor array.
Figure 17:
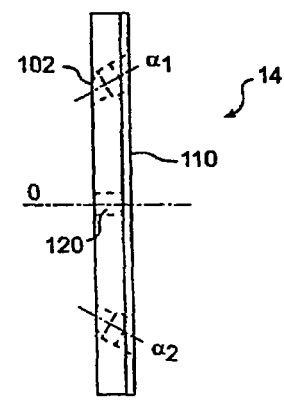
FIG. 17 is a schematic, side view of the fire temperature sensor array of FIG. 15.
Figure 16:
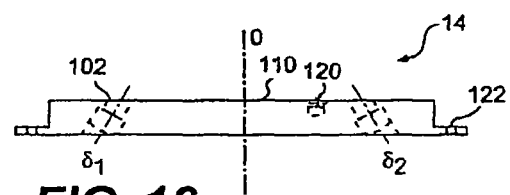
FIG. 16 is a schematic, front view of the fire temperature sensor array of FIG. 15.

As shown in FIGS. 15-17, the exemplary fire temperature sensor 14 may include a mounting base 112 having a number of apertures 122 for mounting the mounting base 112 to, for example, a cargo area 32 of a cargo transportation vehicle, such as a cargo aircraft 30. As can be seen in FIGS. 16 and 17, the temperature sensors 102 may be mounted in the mounting base 112 so that they are aimed at slightly differing orientations, such they the area they collectively monitor is optimized. For example, the angles $\delta_1$ and $\delta_2$ may range from about 1 degree to about 60 degrees. Referring to FIG. 17, each column of the exemplary temperature sensor array 110 of FIG. 17 may include temperature sensors 102, each oriented at an angle ($\alpha_1$ and $\alpha_2$) that varies slightly from the angle of the other temperature sensors 102 for a given column of the temperature sensor array 110. For example, the angles $\alpha_1$ and $\alpha_2$ may range from about 1 degree to about 60 degrees.

A temperature sensor array 110 having relatively fewer temperature sensors 102 than, for example, the temperature sensor array 110 shown in FIGS. 12-14, may be used, for example, in a situation in which the area to be observed by the temperature sensor array 110 is smaller and/or the distance (e.g., vertical distance) from the temperature sensor array 110 to the area to be monitored is relatively close. For example, some cargo containers 20 have a height such that the upper surface of the cargo container 20 is located relatively close to a given thermopile sensor array 110. In such cases, a relatively fewer number of thermopiles 102 may be used to effectively monitor the area of the upper surface of the cargo container 20. On the other hand, cargo pallets 22, for example, may have upper surfaces that are relatively farther away from a temperature sensor array 110 than, for example, the upper surface of a cargo container 20. As a result, a temperature sensor array 110 having a relatively higher number of thermopiles 102 may be used to effectively monitor the area of the upper surfaces of the cargo pallet 22.

For example, a temperature sensor array 110 having relatively fewer temperature sensors 102, for example, four temperature sensors 102, such as shown in FIGS. 15-17, may be used for monitoring the upper surface of a cargo container 20, and a temperature sensor array 110 having a larger number of temperature sensors 102, for example, thirty-six temperature sensors 102, such as shown in FIGS. 12-14, may be used for monitoring the upper surfaces of a cargo pallet 22. Of course, the number and arrangement of temperature sensors 102 for a fire temperature sensor 14 may be determined through routine experimentation by a person having skill in the art.

One or more fire temperature sensors 14 may be mounted throughout, for example, a cargo aircraft 30 cargo area 32, and the number and location of each of the fire temperature sensors 14 may be determined, for example, by aircraft engineers. Each fire temperature sensor 14 may be configured and arranged to monitor a defined area for excessive heat indicating a potentially dangerous condition and/or fire.

Each fire temperature sensor 14 may send its output to the fire alerting system 16 via, for example, a digital data bus. The fire alerting system 16 may include a fire warning computer 24, which, for example, may combine and monitor the status of one or more, for example, all, of the fire temperature sensors 14 located in the cargo area 32. A fire alerting system 16 may in turn send the status of each of the fire temperature sensors 14 to a fire control panel 18, which may be, for example, located in a cargo aircraft 30 cockpit or other location where the fire control panel 18 may be monitored. The fire alerting system 16 may also, or alternatively, send data concerning the status of each of the fire temperature sensors 14 to other aircraft system users and/or may send a warning signal to a cockpit control panel 18 to alert the flight crew of an area experiencing excessive heat and/or a fire. Thereafter, the flight crew may manually activate a fire suppression system or a fire suppression system may automatically be activated.

For example, according to some exemplary embodiments, each fire temperature sensor 14 may monitor one of two variable baseline ambient cargo area temperatures, the ambient temperature of the cargo area 32 while the aircraft 30 is on the ground, and the ambient temperature of the cargo area while the aircraft is in flight. The fire temperature sensors 14 may trigger alerts, for example, when predetermined differentials in these temperatures are detected during ground operation and/or during in-flight operation. Monitoring baseline ambient cargo temperatures may be desirable, for example, because the ground temperature of some geographic regions may be relatively low (e.g., in Alaska during the winter) while the ground temperature of some geographic regions may be relatively high (e.g., in Arizona during the summer), so that that monitoring a single, fixed baseline ambient temperature might result in the unintended triggering of warnings. On the other hand, in-flight operation temperatures may not experience much temperature variation.

During operation, the fire alerting system 16 may be configured to issue two types of warnings. For example, when a fire temperature sensor 14 (or any one of more of its temperature sensors 102) detects a temperature T1 that exceeds the ambient temperature for either ground or in-flight operation by a predetermined differential, a first warning may be triggered, which indicates a cautionary condition. When, on the other hand, a fire temperature sensor 14 (or any one of more of its temperature sensors 102) detects that the temperature that exceeds the ambient temperature for either ground or in-flight operation by the predetermined differential has continued to rise and/or has reached a predetermined alert or emergency level by virtue of reaching a second predetermined temperature T2, a second warning may be triggered, which indicates an alert and/or emergency condition. The temperatures T1 and T2 may be indicated on the fire control panel 18, for example, located in the cockpit of the aircraft 30. Thereafter, the flight crew may manually activate a fire suppression system or a fire suppression system may be automatically activated.

Figure 18:
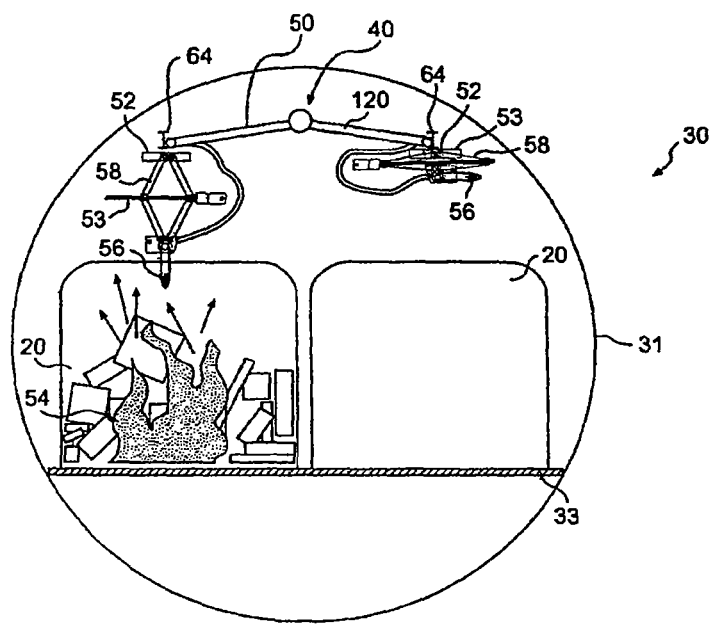
FIG. 18 is a schematic, section view of portions of an exemplary embodiment of a fire suppression system shown with exemplary cargo containers.
Figure 19:
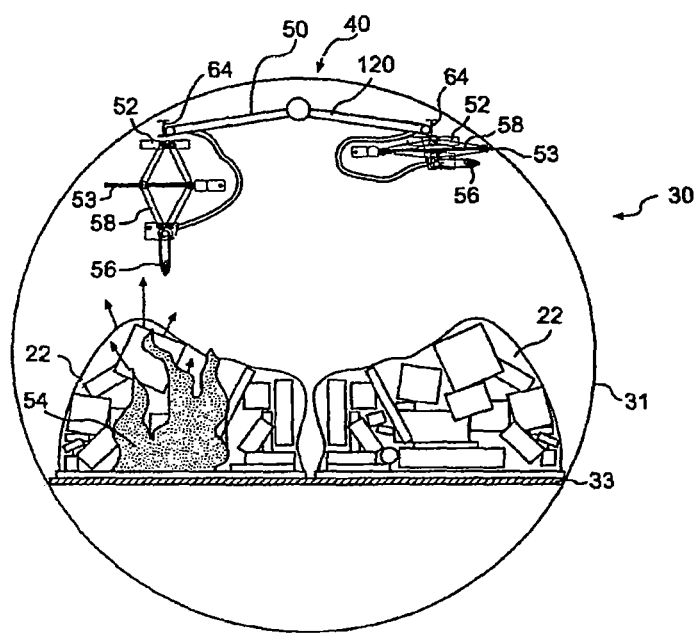
FIG. 19 is a schematic, section view of the FIG. 18 fire suppression system embodiment shown with exemplary cargo pallets.

FIGS. 18 and 19 depict exemplary aspects of a fire suppression system 40. For example, FIG. 18 schematically depicts a cross-section of a cargo aircraft 30, which includes a fuselage 31 and a cargo floor 33. According to some exemplary embodiments of a fire suppression system 40, such a system may include, for example, a fire suppressant delivery system 50, including a device 52 for delivering fire suppressant and a distribution system 60 for delivering fire suppressant to a fire suppressant delivery device 52.

Referring to FIG. 18, a cargo aircraft 30 may include a number of cargo containers 20 located on a cargo floor 33 of a cargo area 32. Although not necessary to the fire suppression system 40, some exemplary embodiments may include one or more fire temperature sensors 14 such as, for example, the exemplary fire temperature sensors 14 described herein, which may be configured to detect an undesirable temperature rise and/or fire that may be associated with one or more cargo containers 20 and/or cargo pallets 22.

The fire suppression system 40 may include a device 52 configured to deliver a suppressant material to a cargo container 20 and/or cargo pallet 22 experiencing a high temperature and/or a fire. For example, if a fire occurs in a cargo container 20 (such as schematically depicted in FIG. 18, for example), the flames 54 of the fire and the base of the fire may generally be located within the interior 21 of a cargo container 20. Since the fire is located within the interior 21 of the cargo container 20, it may be desirable to have a fire suppression system 40 that is capable of delivering fire suppressant into the interior 21 of the cargo container 20 in order to deliver the fire suppressant to the flames 54 and/or base of the fire.

As depicted in the exemplary arrangement shown in FIG. 18, the fire suppressant delivery devices 52, which may be mounted, for example, over each cargo container 20 and/or cargo pallet 22 (see, e.g., FIG. 19) may include a nozzle 56 and an extension device 58. The nozzle 56 may be configured to penetrate, for example, an upper surface of a cargo container 20, and once the cargo container 20 has been penetrated, to discharge a fire suppressant into the cargo container 20.

Figure 20:
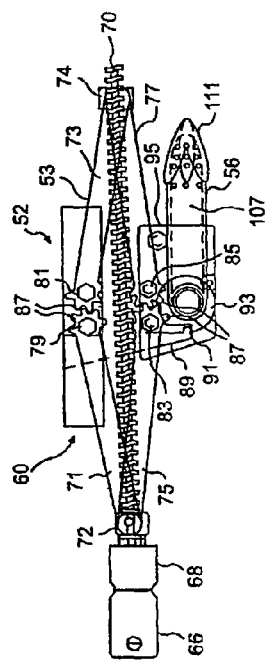
FIG. 20 is a schematic, side view of an exemplary embodiment of a device for releasing fire suppressant shown in a retracted position.
Figure 21:
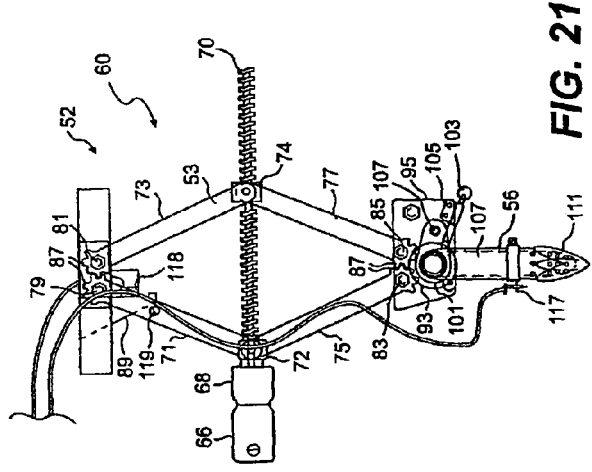
FIG. 21 is a schematic, side view of the device of FIG. 20 shown in an extended position.
Figure 22:
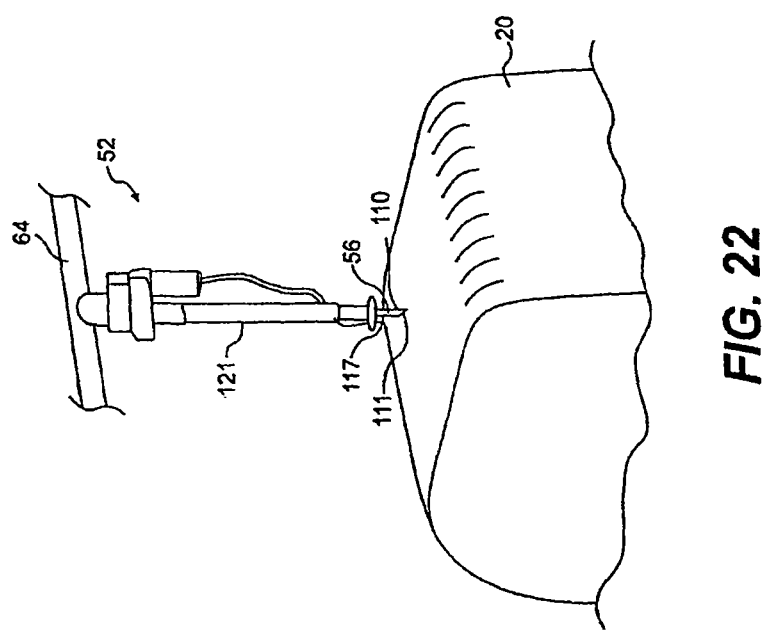
FIG. 22 is a schematic, perspective view of another exemplary embodiment of a device for releasing fire suppressant.

The fire suppressant delivery device 52 may be configured to be stored in a retracted condition when not in use (e.g., as shown in FIG. 21), and may be configured to be extended (e.g., as shown in FIG. 22) during activation via the extension device 58. In the exemplary embodiments depicted in FIGS. 18 and 19, the extension device 58 includes a scissors device 60 (see, e.g., FIGS. 20 and 21). According to some embodiments, the extension device 58 may be a linear actuator (see, e.g., FIG. 22). The extension device 58 may include a sensor 62 that may be preset to have a predetermined extension limit configured to trigger the discharge of fire suppressant into a cargo container 20 and/or above a cargo pallet 22. The fire suppressant delivery device nozzle 56 may be configured to pierce the upper surface of a cargo container 20 and/or to discharge fire suppressant into the cargo container 20 or onto upper surfaces of a cargo pallet 22.

Referring to FIGS. 20 and 21, which depict an exemplary embodiment of a fire suppressant delivery device 52, the fire suppressant delivery device 52 may include an extension device 58, such as the depicted scissors device 60 and may be mounted over each cargo container 20 and/or cargo pallet 22 position such that fire suppressant can be delivered to the cargo containers 20 and/or cargo pallets 22, for example, in case of a fire or thermal event associated with one or more of the cargo containers 20 and/or cargo pallets 22. For example, the fire suppressant delivery device 52 may be fixed overhead in the aircraft fuselage 31, for example, via a mounting structure 64, which may be formed of extruded angles and/or beams (e.g., aluminum angles and/or I-beams). The mounting structure 64 may vary depending upon the type of cargo area (e.g., of a vehicle or a storage facility) and may be specific to the type, shape, and/or size of the cargo containers 20 and/or pallets 22. The mounting structure 64 may attach to a base of the fire suppressant delivery device 52 via rivets, bolts, screws, adhesive and/or any other desired attachment structure or method.

According to some embodiments, the fire suppressant delivery device 52 may be configured to extend downward, for example, via an extension device 58 when activated by an alerting system, such as the fire detection system 10 described previously herein, although the fire suppressant delivery device 52 may be used without such a system (e.g., via manual activation) and/or in conjunction with other fire alerting systems. The fire suppressant delivery device 52 may be stowed with the extension device 53 in a retracted position (see, e.g., FIG. 21), for example, while not activated to provide increased clearance for cargo and/or cargo personnel moving within the cargo area 32. When the fire suppressant delivery device 52 is activated (e.g., when responding to a detected high temperature and/or a fire), the extension device 53 may be extended via a motor 66, which may drive a gear box 68, which turns a threaded acme rod 70 (see, e.g., FIGS. 20 and 21). The threaded acme rod 70 passes through a motor mount trunnion 72 and engages a threaded trunnion 74. The motor 66 may be, for example, either a DC-type motor operating on nominal 24-28 volt aircraft power or an AC-type motor operating on 115 volt, 400 hertz, 3-phased, aircraft power. The threaded trunnion 74 causes expansion of four pivoted link arms 71, 73, 75, and 77, which are pivoted on four pivot bolts 79, 81, 83, and 85 having spacers. Each of the four pivoted link arms 71, 73, 75, and 77, although visually similar, have slightly different gear cadence (gear tooth locations) at their upper and lower ends. At top and bottom locations of each of the pivoted link arms 71, 73, 75, and 77, gear teeth 87 may be provided to cooperate with each other for mutual support of the pivoted link arms 71, 73, 75, and 77.

According to some embodiments, the nozzle 56 may be held in a retracted and/or horizontal position by a detent arm 89, which engages a depressed area 91 in a detent cam 93. The nozzle 56 may be configured to rotate, for example, approximately 90° in a frame 95, which includes two frame pieces 97 and 99 held together by frame bolts and spacers. As the pivoted link arms 71, 73, 75, and 77 extend, the nozzle 56 is driven to an extended and/or vertical position via, for example, a spring 101. The nozzle 56 may then be locked in a vertical position by a spring-loaded plunger 103, which slides in a lower detent mount 105 and engages in the detent cam 93. This may prevent the nozzle 56 from folding or jackknifing upon contacting, for example, the top of either a cargo container 20 or a cargo pallet 22. The nozzle 56 is hollow and provides a passage 107 for fire suppressant delivery therethrough and may include a swivel port 109 to accommodate flow of fire suppressant to the passage 107, so that fire suppressant can be delivered through the passage 107 to a cargo container 20 and/or a cargo pallet 22. The nozzle 56 may include a piercing end 110 configured to penetrate the upper surface of a cargo container 20. The piercing end 110 may include a hardened edge 111 formed of, for example, carbide and/or similar material.

Aircraft cargo containers sometimes have relatively light gauge roofs constructed of, for example, 0.032 inch to 0.040 inch thick 2024 series aluminum. The nozzle 56, for example, may include an interior portion housing a screen 113 (e.g., having a conical shape) to facilitate formation of bubbles for foam-type fire suppressant agents. The nozzle 56 may be configured to accommodate either a single-component suppressant agent and/or a multi-component suppressant agent, which may be mixed, for example, within the nozzle 56 prior to delivery into a cargo container 20 and/or delivery onto a cargo pallet 22. For example, the fuselage 31 of an aircraft 30 may include supply manifolds and/or supply lines for delivering fire suppressant agents to the fire suppressant delivery device 52.

The nozzle 56 may include an external collar 115, for example, which serves as a mount for a cargo container limit microswitch 117. When a cargo container 20 has been penetrated by the nozzle 56 to a sufficient depth to allow fire suppressant to be delivered into the cargo container 20, the limit microswitch 117 may be triggered to terminate power to the fire suppressant delivery device motor 66, and may open a valve (see, e.g., FIGS. 23-25), which allows fire suppressant under pressure to flow through the nozzle 56 and into the cargo container 20.

If the nozzle 56 does not encounter a cargo container 20 during its downward travel, for example, when there is either a shorter cargo container 20 or a cargo pallet 22 in that particular cargo location, the extension device 53 will continue to extend to its fully extended limit until a full-extent limit microswitch 118 contacts an adjustable contact 119 (e.g., an adjustable eccentric contact), power to the motor 66 will be terminated, and a valve (see, e.g., FIGS. 23-25) will allow fire suppressant under pressure to flow through the nozzle passage 107 and flood an area underneath the fire suppressant delivery device 52.

As mentioned above, some embodiments of fire suppressant delivery device 52 may include an extension device 53 including a linear actuator 121. For example, FIG. 22 schematically depicts a fire suppressant delivery device 52, which may include a linear actuator 121 coupled to a mounting structure 64. According to some embodiments, the linear actuator 121 may be pneumatically operated via, for example, a pneumatic pump, hydraulic fluid, and/or pressurized gas. According to some embodiments, the linear actuator 121 may be electrically operated. The fire suppressant delivery device 52 may include a nozzle 56 having a piercing end 110 configured to penetrate the upper surface of a cargo container 20. The piercing end 110 may include a hardened edge 111 formed of, for example, carbide or other similar material. According to some embodiments, the fire suppressant delivery device 52 may further include a limit microswitch 117 configured to stop extension of the linear actuator 121 when the piercing end 110 of the nozzle 56 has reached a sufficient depth into the cargo container 20 to allow fire suppressant to be delivered to the interior of the cargo container 20.

Some embodiments of a fire suppression system 40 may include a fire suppressant distribution system 120 for distributing fire suppressant to, for example, a fire suppressant delivery device 52, such as described herein, although the fire suppressant distribution system 120 may be used in association with other devices and/or methods and/or in other environments. Fire suppressant may be used to suppress any flames and/or may provide a large cooling effect, thereby increasing the effectiveness of the fire suppression system 40. The fire suppressant may include a chemical knock-down agent, for example, in either a gaseous and/or particulate form, which may suppress flames and/or which may provide a large cooling effect, thereby increasing the effectiveness of any foam agent delivered to the fire or heat, for example, by substantially preventing the boiling of the foam agent prior to application to the flames or heat.

Figure 23:
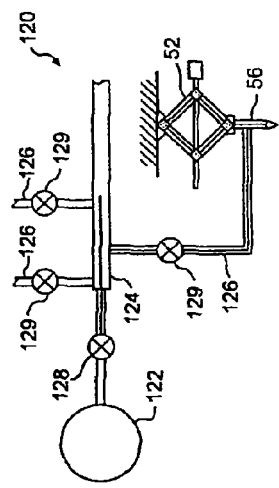
FIG. 23 is a schematic view of an exemplary embodiment of a fire suppressant distribution system.

In the exemplary embodiment of a fire suppressant distribution system 120 shown in FIG. 23, for example, a foam suppressant agent may be contained in a container 122 (e.g., a pressure vessel). The container 122 may be formed, for example, from aluminum-spun carbon fiber or other suitable material (i.e., when container 122 is a pressure vessel). The foam suppressant agent may include, for example, a surfactant having a propellant gas and an aerating gas dissolved therein, for example, somewhat similar to a can of shaving cream. For example, the foam suppressant agent may be aerated with a non-oxygen carrying gas such as, for example, nitrogen and/or argon, and may be a nitrogen-aerated foam and/or argon-aerated foam (e.g., a foam marketed by Ansul Inc. as TARGET 7). According to some exemplary embodiments, a foam generator may be provided for generating foam suppressant agent. For example, the foam generator may include a conical screen (not shown) into which surfactant is sprayed while gas flows through the conical screen, thereby generating foam suppressant agent. The surfactant may be altered (e.g., chemically) to vary its properties, such as, for example, its viscosity and/or persistence, to optimize the foam's properties for its intended use.

When the surfactant and gas are released from the container 122, the surfactant and gas may generate a foam suppressant agent, which may then flow through, for example, a single distribution manifold 124 and through one of multiple branch feed lines 126 to a fire suppressant delivery device 52 positioned over a cargo container 20 and/or cargo pallet 22 experiencing an undesirably high temperature and/or a fire. A shut-off valve 128 may be located in the branch feed line 126 and may open, thereby directing the foam suppressant agent to flow through the fire suppressant delivery device 52, where it may either be injected into a cargo container 20 or substantially blanket a cargo pallet 22, thereby suppressing and/or extinguishing a fire and/or cooling any undesirably high temperatures associated with the cargo container 20 or cargo pallet 22.

Figure 24:
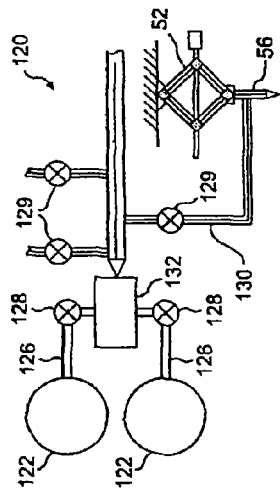
FIG. 24 is a schematic view of another exemplary embodiment of a fire suppressant distribution system.

The exemplary embodiment of fire suppressant distribution system shown in FIG. 24 includes two containers 122, one for containing surfactant and one for containing gas. For example, the surfactant may be a foam marketed by Ansul Inc. as TARGET 7, and the gas may be a non-oxygen carrying gas such as nitrogen and/or argon. The container 122 for containing gas may be a pressure vessel, and the container 122 containing surfactant may be a corrosion-resistant tank. Each container 122 may be in flow communication with a main mixing nozzle 132 via branch feed lines 126. The branch feed lines 126 may each include a shut-off valve 128. The main mixing nozzle 132 may be in flow communication with a distribution manifold 124. The distribution manifold 124 may be in flow communication with a fire suppressant delivery device 52 having a nozzle delivery line 130, which may include a shut-off valve 129. The main mixing nozzle 132 may be configured to receive surfactant and gas from the containers 122 and to generate a foam suppressant agent. The foam suppressant agent may then be conveyed (e.g., via pumping) through the distribution manifold 124 and through the delivery line 130 and shut-off valve 129 to the fire suppressant delivery device 52 located over either a cargo container 20 or a cargo pallet 22 experiencing a fire and/or undesirably high heat, thereby suppressing and/or extinguishing the fire and/or cooling the high heat condition.

Figure 25:
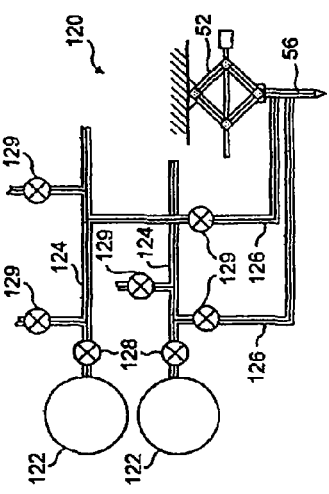
FIG. 25 is a schematic view of a further exemplary embodiment of a fire suppressant distribution system.

The exemplary embodiment of fire suppressant distribution system 120 depicted in FIG. 25 is configured to generate foam suppressant agent at the location of each fire suppressant delivery device 52. In this exemplary embodiment, two containers 122, one containing surfactant and one containing gas, may be in flow communication with two distribution manifolds 124 rather than a single manifold 124. Each container 122 may include a shut-off valve 128. The two distribution manifolds 124 may be in flow communication with two branch lines 126, one for surfactant and one for gas, for each fire suppressant material delivery device 52. Each branch line 126 may include a shut-off valve 129. According to some embodiments, when activated, surfactant may be injected into a vertically-oriented nozzle 56 such that a screen 113 (e.g., having a conical shape) located within the nozzle passage 107 (see, e.g., FIGS. 21 and 22) may be coated with surfactant in a substantially continuous manner during activation, and a gas may be substantially constantly blown at a relatively low pressure from an annular ring of openings (not shown) surrounding the nozzle 56 into the screen 113. As gas passes through the surfactant-coated screen 113, bubbles of foam suppressant agent are generated and are delivered via the nozzle 56 to the cargo container 20 and/or cargo pallet 22 experiencing a fire and/or undesirably high heat, thereby suppressing and/or extinguishing the fire and/or cooling the high heat condition.

According exemplary embodiments, each of the systems may be used together. For example, a combination fire detection system and fire suppression system may include a fire detection system 10, including a fire temperature sensor system 12, which may include one or more fire temperature sensors 14. The combination system may further include a fire altering system 16 and a fire control panel 18. The combination system may also include a fire suppression system 40, including a fire suppressant distribution system 120 having one or more fire suppressant delivery devices 52.

During operation, one or more of the fire temperature sensors 14 may detect a fire or an undesirably high temperature associated with a cargo container 20 or cargo pallet 22. A signal from the fire temperature sensor 14 may be received by the fire alerting system 16, which may send a signal to the fire control panel 18 alerting, for example, a flight crew, to the presence of a fire or an undesirably high temperature. The fire alerting system 16 may automatically activate the fire suppression system 40. Alternatively, a member of the fight crew may activate the fire suppression system 40 manually. Once the fire suppression system 40 has been activated, it may deliver fire suppressant material to the area experiencing the fire or undesirably high temperature via the fire suppressant distribution system 120 and one or more fire suppressant delivery devices 52.

Although the various systems described herein may be used in conjunction with one another, according to certain embodiments, it is contemplated that any single one of the systems described herein may be used without the other systems described herein, or that any number of the described systems may be used together.

It will be apparent to those skilled in the art that various modifications and variations can be made to the structure described herein. Thus, it should be understood that the invention is not limited to the subject matter discussed in the specification. Rather, the present invention is intended to cover modifications and variations.

What is claimed is:

1. A temperature sensor array configured to receive temperature information associated with an area, the temperature sensor array comprising:

a base, and a plurality of temperature sensing devices associated with the base such that the temperature sensing devices are arranged to monitor the temperature of the area, wherein at least one of the temperature sensing devices is oriented at an angle with respect to the base that differs from an angle with respect to the base at which at least one other temperature sensing device is oriented; at least two of the temperature sensing devices are oriented at respective angles with respect to the base such that an area monitored by one of the at least two temperature sensing devices does not overlap an area monitored by the other of the at least two temperature sensing devices; and the base defines a plurality of apertures configured to receive at least one temperature sensing device.

2. The temperature sensor array of claim 1, wherein the apertures are configured such that each of the temperature sensing devices is aimed so that each temperature sensing device receives temperature information from at least a portion of the area different from another temperature sensing device.

* * * * *